United States Patent Office 2,956,817
Patented Oct. 18, 1960

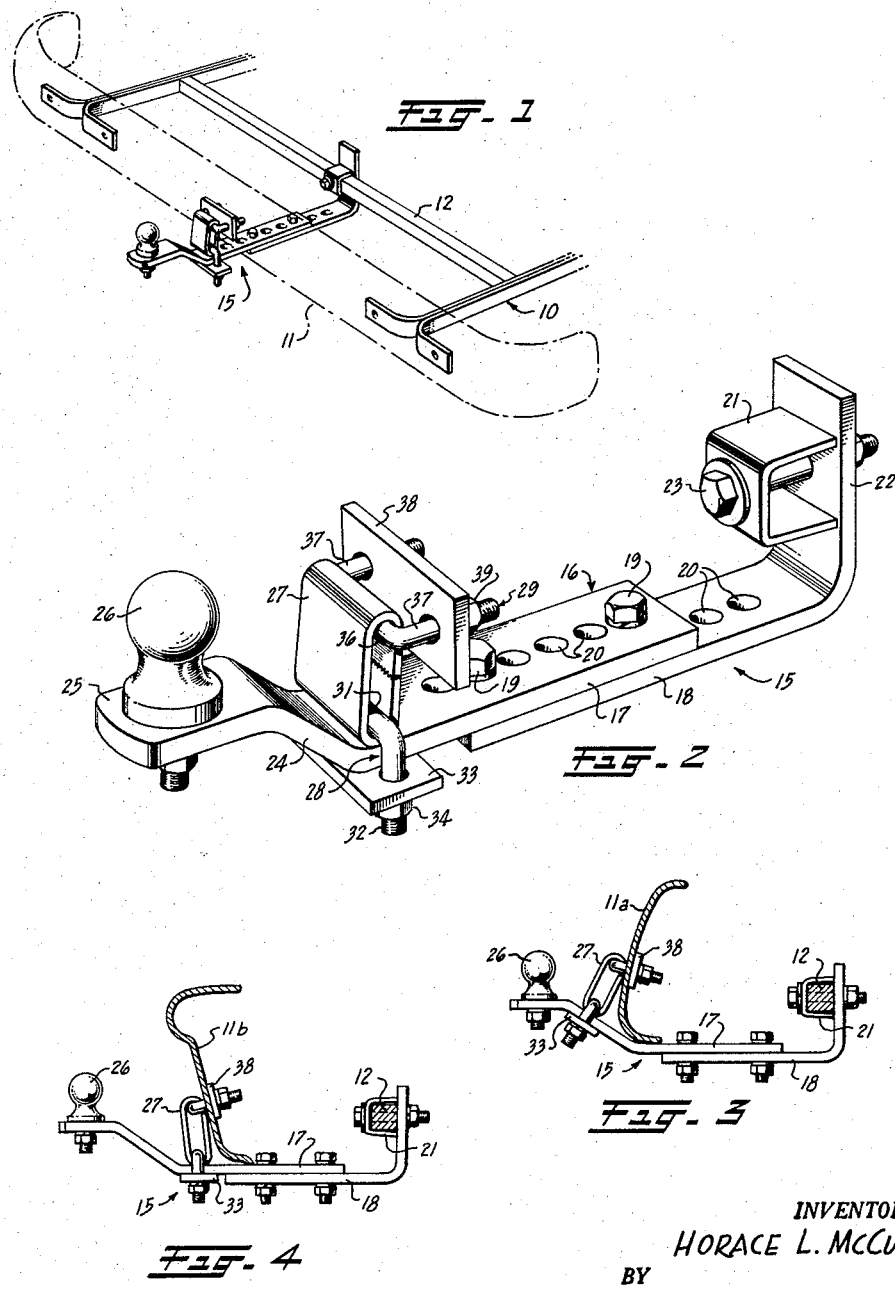

2,956,817

TRAILER HITCH

Horace L. McCurdy, Lodi, Calif., assignor to Valley Tow-Rite, Inc., Lodi, Calif., a corporation of California Filed Feb. 23, 1960, Ser. No. 10,430

1 Claim. (Cl. 280—501)

This invention relates to trailer hitches connectable to the frame and bumper of a car so that a trailer may be towed thereby, and has for its primary object the provision of an improved trailer hitch that is easily adjustable to fit rigidly onto a great variety of cars.

The semi-permanent type trailer hitches now commonly in use and to which this invention is directed, are connected to the rear end of a car, with the front end of the hitch being bolted to the car frame, and with the rear end of the hitch being bolted to the rear bumper. With a trailer connected to the hitch, two directions of force are exerted by the trailer on the hitch. First, the trailer exerts a pull or push on the hitch when the car and trailer are in motion. This force is transmitted directly to the frame of the car through the frame connection of the hitch. Practically no pull is exerted on the car bumper, which is not designed nor built for pulling.

The other force exerted by the trailer on the hitch is the vertical force through the ball connection therebetween. Such force can be exerted either by the dead weight of the front end of the trailer on the hitch, or by the inertia of the trailer as the rear bumper of the car goes up or down due to dips, bumps or the like in the pavement. This force, which is considerably less than the pulling force, is exerted primarily on the rear bumper of the car.

Obviously, the connections between the trailer hitch and the car must be as rigid as possible to prevent damage to the trailer hitch or car in operation. If the frame connection becomes loose, then the play between the hitch and frame can cause increasing damage due to inertia of the trailer as the car starts or stops suddenly. The same is true of the hitch to bumper connection. If this connection is not rigid, then the play therebetween increases in normal operation until the bumper becomes seriously damaged or the connection is broken.

The easiest way to make rigid connection between the trailer hitch and car is to design the hitch for use with the frame and bumper of a specific model car. However, if this is done, a great variety of different hitch bars would have to be made and would create an inordinately large inventory for a merchandiser thereof. The other solution is to design a hinge for use with a large variety of cars. However, when this is done, it is difficult to fit each car and make a sufficiently rigid connection thereto so as to avoid the damage referred to above.

The present invention has been made to provide a trailer hitch which will fit onto a great number of different type frames and bumpers and which will connect rigidly to these frames and bumpers so as to operate satisfactorily in use.

Another object of the invention is to provide a trailer hitch in which the hitch is connected to three points on the frame and bumper of a car to increase the stability of the connection.

Still another object of the invention is to provide a trailer hitch having a rigid vertical connection to the bumper of a car which will allow some horizontal play therebetween.

Other objects and advantages will become apparent in the course of the following detailed description.

In the drawings, forming a part of this application, and in which like parts are designated by like reference numerals throughout the same, Fig. 1 is a perspective view of a trailer hitch, embodying the principles of the invention, illustrating the relation of the hitch to the frame and bumper of a car, the bumper being shown in phantom.

Fig. 2 is an enlarged perspective view of the trailer hitch of Fig. 1.

Figs. 3 and 4 are side elevational views of the trailer hitch of Fig. 1, illustrating the adjustments thereof enabling the hitch to be connected to two different types of car bumpers.

Referring now to the drawings, Fig. 1 illustrates the frame 10 and rear bumper 11 of a car (not otherwise shown) with the bumper being connected to the rear ends of the frame, and with the frame having an integral cross bar 12. The trailer hitch, generally indicated by the reference numeral 15, is rigidly secured to the frame cross bar 12 and to the bumper 11.

The trailer hitch 15 comprises as its chief member the tow bar 16 formed by the two elongated flat straps 17 and 18 which are connected rigidly together by bolts 19 extending through the registered adjustment holes 20 in the straps. U-shaped bracket 21, associated with the upturned front end 22 of strap 18, is designed to embrace the frame cross bar 12 and to be rigidly bolted to strap 18 by bolt 23. The bracket 21 may also be disposed on the other side of the front end of strap 18, if desired, so that the front end of the tow bar can be installed rearwardly of the frame member 12. Strap 17 has a portion thereof near its rear end which is inclined upwardly and rearwardly at 24, and the rear end 25 thereof forms a generally horizontal platform to which is secured the trailer ball 26.

The means for securing the tow bar 16 to the car bumper comprises link 27 and the U-bolts 28 and 29 connecting the link to the tow bar and bumper respectively. As illustrated in the drawings, link 27 is relatively elongated in vertical cross-section, and has a substantial width approximately equal to the width of the strap 17. The body 31 of U-bolt 28 passes through one end of the link, and the U-bolt legs 32 embrace the strap 17 therebetween and extend through the clamp bar 33. Nuts 34 and suitable lock washers enable the clamp bar 33 and link 27 to be drawn tightly together to clamp strap 17 rigidly therebetween. In similar manner, U-bolt 29 has its body 36 extending through the other end of link 27 and its legs 37 extending through clamp bar 38 and having nuts 39 thereon.

Figs. 3 and 4 illustrate the manner in which the trailer hitch 15 is connected to cars having two differently shaped rear bumpers 11a and 11b. In each case, the forward end of the tow bar 16 extends generally horizontally beneath the car, forwardly of the rear bumper, and is bolted to the frame cross bar 12.

Two holes are drilled through the rear bumper to accommodate the legs 37 of the upper U-bolt 29, and the U-bolt legs are inserted therethrough. The clamp bar 38 is placed on the legs, and the nuts 39 are threaded thereon to clamp the rear bumper rigidly between the upper end of link 27 and the clamp bar 38. As may be seen from the drawings, the link 27 can pivot to some extent around both U-bolts 28 and 29 so that the upper U-bolt legs 37 can extend at right angles through the rear bumper. Also, the link 27 may be clamped to the tow bar strap 17 on either the inclined portion 24 thereof or on the horizontal portion forwardly thereof, which allows for vertical adjustment of the link as occasion may demand.

It will be noted from Figs. 3 and 4 that the upper surface of the tow bar is held against the bottom of the rear bumper by link 27 in such manner that there can be no appreciable vertical movement therebetween, which eliminates any chance for vertical play between the trailer and car with attendant fear of damage to one or the other due to bumpy roads or the like. At the same time, it is not desirable to clamp the bumper to the frame in such manner that the resilient characteristics of the bumper are destroyed. Accordingly, if the bumper is hit, as by a following vehicle in normal city driving, the pivotal movement of the U-bolts and link will allow the bumper to move longitudinally relative to the frame through a limited distance even though the tow bar itself cannot move relative to the frame due to the rigid connection therebetween.

It should also be noted that the tow bar is suspended from two points on the rear bumper, that is, from the two points where the legs 37 of the U-bolt 29 pass through the bumper. These two points, plus the point of suspension at the front of the hitch ensure a high degree of rigidity of the tow bar and eliminates any tendency of the tow bar to twist about its longitudinal axis.

As may be seen from the foregoing, the present invention provides a highly adjustable trailer hitch adapted to be rigidly connected to a large variety of rear bumpers and frames of cars. It is to be realized, however, that the particular embodiment of the invention herein shown and described is to be taken only as a preferred embodiment of the same, and that various changes may be made in the shape, size and arrangement of parts without departing from the spirit of the invention or the scope of the attached claim.

Having thus described my invention, what I claim and desire to secure by Letters Patent is:

A trailer hitch for use with and adapted to extend longitudinally underneath the rear end of a car having a frame and a rear bumper, said trailer hitch comprising: an elongated flat tow bar having forward, intermediate and rear portions, the forward portion being adapted to extend generally horizontally beneath said vehicle forwardly from said rear bumper, the intermediate portion being upwardly and rearwardly inclined from said forward portion and the rear portion being extended rearwardly and generally horizontally from the intermediate portion, means for adjusting the length of said forward portion, means for securing the forward end of said tow bar rigidly to said vehicle frame, a trailer ball mounted on said rear tow bar portion, an elongated link having a substantial width and having one end disposed on the upper side of said tow bar, a first clamp bar disposed on the underneath side of said tow bar opposite to said link, a first U-bolt having its body extending through said one one link end and its legs embracing said intermediate tow bar portion therebetween, means for drawing said first clamp bar on said U-bolt legs towards said link to clamp said tow bar therebetween, a second clamp bar disposed adjacent the other end of said link, a second U-bolt having its body extending through the other end of said link, and means for drawing said second clamp bar on the legs of said second U-bolt towards said link, so that said link may be firmly secured to said rear bumper when said link and second clamp bar are on opposite sides of said bumper and the legs of said second U-bolt extend through said bumper.

References Cited in the file of this patent

UNITED STATES PATENTS

| | | |
|---|---|---|
| 2,485,743 | Koback | Oct. 25, 1949 |
| 2,642,295 | Riemann | June 16, 1953 |
| 2,745,681 | Kitterman | May 15, 1956 |
| 2,753,193 | Halverson | July 3, 1956 |
| 2,849,243 | Halverson | Aug. 26, 1958 |